Sept 8, 1925.  1,552,753
C V. MEJSTRIK
HARROW ATTACHMENT FOR CORN PLANTERS
Filed Aug. 16, 1923   2 Sheets-Sheet 1
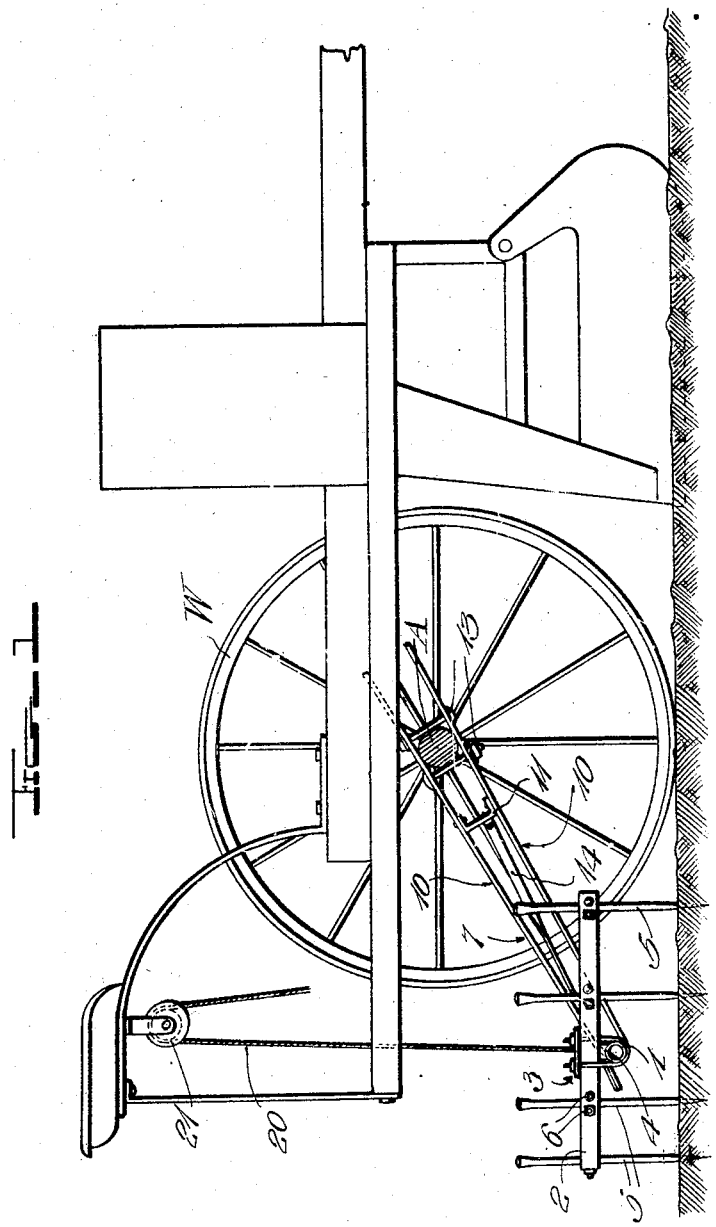
Inventor
Charles V. Mejstrik
Witness
By H. B. Wilson & Co.
Attorneys Sept. 8, 1925.
C. V. MEJSTRIK
1,552,753
HARROW ATTACHMENT FOR CORN PLANTERS
Filed Aug. 16, 1923      2 Sheets-Sheet 2
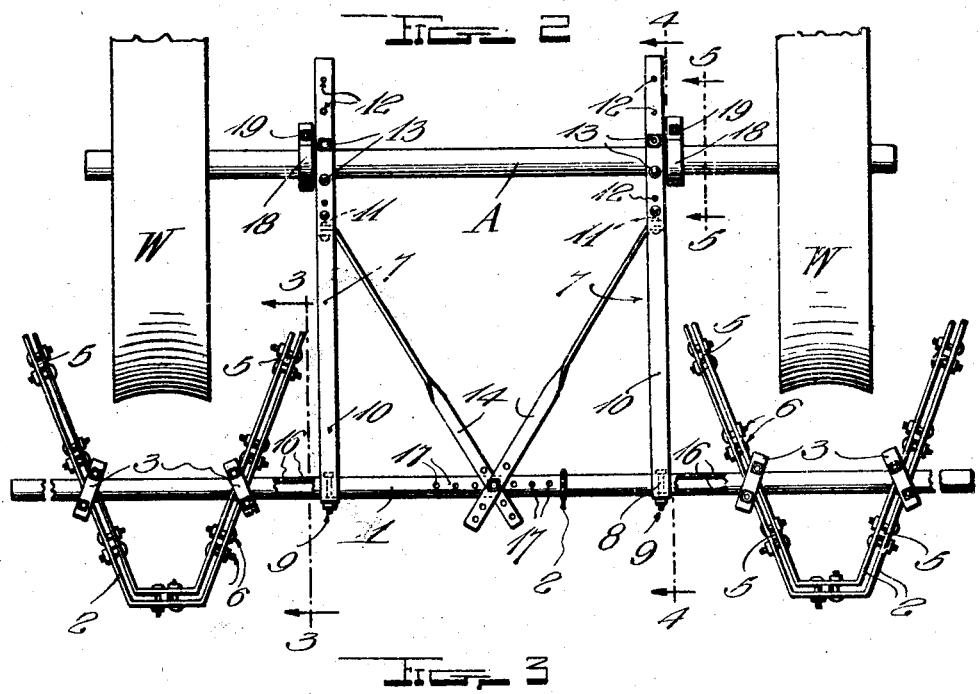
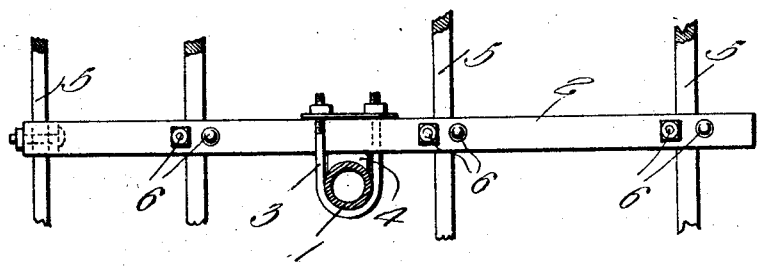
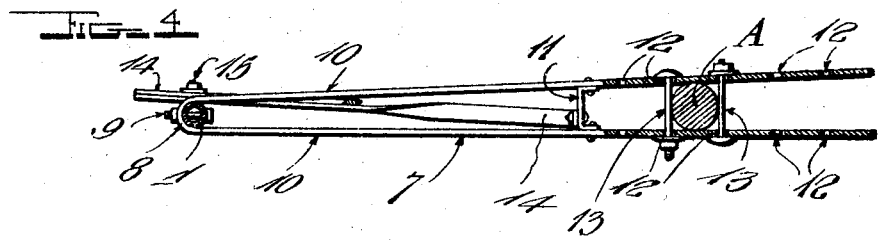
Inventor
Charles V. Mejstrik Patented Sept. 8, 1925.

1,552,753

UNITED STATES PATENT OFFICE.

CHARLES V. MEJSTRIK, OF HOWELL, NEBRASKA, ASSIGNOR OF ONE-HALF TO EMIL E. BRODECKY, OF HOWELL, NEBRASKA.

HARROW ATTACHMENT FOR CORN PLANTERS.

Application filed August 16, 1923. Serial No. 657,740.

*To all whom it may concern:*

Be it known that I, CHARLES V. MEJSTRIK, a citizen of the United States, residing at R. F. D. No. 2, Howell, in the county of Colfax and State of Nebraska, have invented certain new and useful Improvements in Harrow Attachments for Corn Planters; and I do declare the following to be a full, clear, and exact description of the invention, such as will enable others skilled in the art to which it appertains to make and use the same.

My invention relates to improvements in harrow attachments for corn planters, which harrow the ground behind the planter wheels and thus overcome the necessity of performing a separate harrowing operation, after the planting is accomplished.

It is the principal object of the invention to provide an extremely simple and inexpensive, yet a reliable and durable attachment of the class described, which may be easily adjusted for use in connection with practically any kind of corn planter.

With the foregoing in view, the invention resides in the novel subject matter hereinafter described and claimed, the description being supplemented by the accompanying drawings.

Fig. 1 is a side elevation partly in section, showing the application of my invention to a corn planter.

Fig. 2 is the plan view.

Figs. 3, 4 and 5 are sectional views as indicated by lines 3—3, 4—4, 5—5 of Fig. 2.

In the preferred form of the invention, selected for illustration in the present application, I make use of the construction described below:

The numeral 1 designates a horizontal bar for transverse disposition behind the wheels W of a corn planter or other implement, said bar being preferably formed of a piece of pipe. At the end of the bar 1, a pair of U-shaped harrow frames 2 are provided, the side members of said frames being secured adjustably upon the bar 1, by suitable clamps 3, which include saddles 4 interposed between the frames and bar.

Each of the frames 2 is preferably of the two-part construction shown, with harrow teeth 5 clamped between said parts, by bolts 6 passing through the latter, at opposite sides of the teeth. The sides of these frames 2, may well straddle the wheels W or may be otherwise related with the latter, so that the teeth 5 will effectively loosen the soil behind the wheels, with the numerous well-known advantages.

For connecting the bar 1 with the axle A of the implement, or with any other desired transverse part of the latter, I provide a pair of draught arms 7, each of these arms being preferably constructed in the manner shown most clearly in Fig. 4. In forming the arm, I take a metal strap and bend it substantially upon itself at its center, as indicated at 8, the bar 1 being secured by a bolt or the like 9, in the bight portion of the strap. The two strap ends 10 extend forwardly from the bar 1 and near their front ends are connected by a strut 11. Beyond the strut 11, the two strap ends 10 are formed with spaced bolt holes 12 and are disposed in spaced relation to straddle the axle or the like A. Spaced vertical bolts 13 pass through the bolt holes 12 to also straddle the axle or the like A thus pivotally connecting the arm with the implement, and permitting adjustment of said arm forwardly or rearwardly, as may be necessary.

The struts 11 of the two arms 7 are connected by oblique brace bars 14, with the center of the bar 1, a single bolt 15 being shown passing through the rear ends of said brace bars and through an opening in the bar 1, but attention is directed to the fact that this bar 1 is provided with a plurality of openings 16, any of which may receive the bolts 9 and consequently a series of openings 17 are provided to permit attachment of the braces 14 at the necessary points, it being understood that these braces and the arms 7 are moved to desired positions along the bar 1, according to the type of planer upon which the invention is being used. Similar adjustments of the harrow frame 2 may be made, by first loosening the clamps 3.

In some instances, in order to hold the arms 7 against movement along the axle or the like A, it is necessary to use suitable stop collars 18, each of which is here shown as formed of two pivotally connected sections drawn together by a bolt 19.

By employing the construction shown and described or a substantial equivalent thereof, a very simple and inexpensive attachment is provided, yet one which will be highly efficient and in every way desirable. Any suitable provision may be made for raising and for lowering the attachment, and for this purpose I have illustrated a rope or cable 20, connected with the bar 1 and trained over a suitable pulley or the like 21, said rope or cable being adapted for connection to any movable pedal or lever of the planter, or to a special pedal if desired.

Attention may here be directed to the fact that the two U-shaped harrow frames 2, each have their side members disposed in forwardly diverging relation, said side members being adapted to straddle the wheels W of the corn planter. Thus, there is no possibility of improperly placing the two harrow frames with respect to the wheels. Moreover, by disposing the frames in this manner, the teeth 5 thereof serve to draw the earth inwardly over the row to some extent, thus providing additional covering means for the corn which will permit operation of the planter with its seed-dropping means, penetrating the earth to an unusually small extent, which is greatly advantageous as less power is required to draw the implement.

As excellent results may be obtained from the details disclosed, they may be followed if wished, but within the scope of the invention as claimed, numerous changes may be made.

I claim:—

1. A harrow attachment comprising a horizontal harrow-carrying bar for transverse disposition behind an implement, a pair of draught arms extending forwardly from said bar and each comprising upper and lower longitudinal arm members spaced apart at their front ends to straddle a transverse part on the implement; and spaced bolts passing through said spaced ends of the arm members and extending between them to also straddle the above-mentioned part on the implement and pivotally connect the arms therewith.

2. A harrow attachment comprising a horizontal harrow-carrying bar, for transverse disposition behind an implement, a pair of draught arms extending forwardly from said bar and each comprising upper and lower longitudinal arm members spaced apart at their front ends to straddle a transverse part on the implement; spaced bolts passing through said spaced ends of the arm members and extending between them to also straddle the above-mentioned part on the implement and pivotally connect the arms therewith, vertical struts extending between and secured to the upper and lower arm members in rear of said bolts, and oblique braces extending rearwarly from said struts and secured at their rear ends to said bar.

3. A harrow attachment comprising a horizontal harrow-carrying bar for disposition behind an implement, and a pair of draught arms extending forwardly from said bar and each comprising a metal strap bent substantially upon itself at its center and receiving the aforesaid bar in the bight portion, the two halves of said strap terminating in spaced relation to straddle a part of the implement, a vertical strut extending between said halves and secured thereto, an oblique brace from the strut to the aforesaid bar, and a pair of spaced bolts passing through said spaced strap ends for straddling the above-named implement part.

In testimony whereof I have hereunto affixed my signature.

CHARLES V. MEJSTRIK.